United States Patent
Seo et al.

(10) Patent No.: US 10,313,747 B2
(45) Date of Patent: *Jun. 4, 2019

(54) MEDIA CHANNEL IDENTIFICATION WITH MULTI-MATCH DETECTION AND DISAMBIGUATION BASED ON TIME OF BROADCAST

(71) Applicant: Gracenote, Inc., Emeryville, CA (US)

(72) Inventors: Chung Won Seo, Seoul (KR);
Youngmoo Kwon, Goyang (KR);
Jaehyung Lee, Seoul (KR)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,800

(22) Filed: Jun. 22, 2018

(65) Prior Publication Data
US 2018/0302668 A1    Oct. 18, 2018

Related U.S. Application Data

(63) Continuation of application No. 15/343,895, filed on Nov. 4, 2016, now Pat. No. 10,045,073.
(Continued)

(51) Int. Cl.
*H04N 21/81* (2011.01)
*H04N 21/435* (2011.01)
(Continued)

(52) U.S. Cl.
CPC ... *H04N 21/44008* (2013.01); *H04N 21/2353* (2013.01); *H04N 21/23418* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,653,921 B2 | 1/2010 | Herley | |
| 7,788,696 B2 | 8/2010 | Burges et al. | |

(Continued)

FOREIGN PATENT DOCUMENTS

| | | |
|---|---|---|
| CN | 103501449 | 1/2014 |
| CN | 103581705 | 2/2014 |

(Continued)

OTHER PUBLICATIONS

US 9,189,826 B1, 11/2015, Sharifi et al. (withdrawn)
(Continued)

*Primary Examiner* — Kieu Oanh T Bui
(74) *Attorney, Agent, or Firm* — McDonnell Boehnen Hulbert & Berghoff LLP

(57) ABSTRACT

Disclosed herein are methods and systems to help disambiguate channel identification in a scenario where fingerprint data of media content being rendered by a media presentation device matches multiple reference fingerprints corresponding respectively with multiple different channels. Upon detecting such a multi-match, a server or other entity will perform disambiguation based at least in part on a comparison of time of broadcast of the media content being rendered by the media presentation device with time of broadcast of the media content represented by the reference fingerprints. The server or other entity will thereby determine the channel on which the media content being rendered by the media presentation device is arriving, so as to facilitate taking channel-specific action.

20 Claims, 6 Drawing Sheets

Related U.S. Application Data

(60) Provisional application No. 62/301,616, filed on Feb. 29, 2016.

(51) Int. Cl.

| | | |
|---|---|---|
| *H04N 21/44* | (2011.01) | |
| *H04N 21/442* | (2011.01) | |
| *H04N 21/475* | (2011.01) | |
| *H04N 21/438* | (2011.01) | |
| *H04N 21/61* | (2011.01) | |
| *H04N 21/234* | (2011.01) | |
| *H04N 21/235* | (2011.01) | |
| *H04N 21/24* | (2011.01) | |
| *H04N 21/258* | (2011.01) | |
| *H04N 21/6543* | (2011.01) | |
| *H04N 21/8358* | (2011.01) | |
| *H04N 21/431* | (2011.01) | |
| *H04N 21/84* | (2011.01) | |
| *H04N 21/845* | (2011.01) | |

(52) U.S. Cl.
CPC ... *H04N 21/2407* (2013.01); *H04N 21/25841* (2013.01); *H04N 21/431* (2013.01); *H04N 21/435* (2013.01); *H04N 21/4383* (2013.01); *H04N 21/44204* (2013.01); *H04N 21/44222* (2013.01); *H04N 21/4756* (2013.01); *H04N 21/6118* (2013.01); *H04N 21/6543* (2013.01); *H04N 21/812* (2013.01); *H04N 21/8358* (2013.01); *H04N 21/84* (2013.01); *H04N 21/8456* (2013.01)

(56) References Cited

U.S. PATENT DOCUMENTS

| | | | |
|---|---|---|---|
| 7,797,249 | B2 | 9/2010 | Schmeizer et al. |
| 7,917,645 | B2 | 3/2011 | Ikezoye et al. |
| 8,150,096 | B2 | 4/2012 | Alattar |
| 8,185,733 | B2 | 5/2012 | Schwartz et al. |
| 8,510,770 | B1 | 8/2013 | Oztaskent et al. |
| 8,649,659 | B2 | 2/2014 | Lalwaney |
| 8,700,194 | B2 | 4/2014 | Bauer et al. |
| 9,094,715 | B2 | 7/2015 | Neumeier et al. |
| 9,203,538 | B2 | 12/2015 | Anniballi et al. |
| 9,240,851 | B2 | 1/2016 | Park |
| 9,412,330 | B2 | 8/2016 | Keating et al. |
| 9,465,995 | B2 | 10/2016 | Harron et al. |
| 9,635,417 | B2 | 4/2017 | Grant et al. |
| 9,704,016 | B2 | 7/2017 | Jang et al. |
| 9,706,261 | B2 | 7/2017 | Chen |
| 9,986,306 | B2 | 5/2018 | Nagorski et al. |
| 2002/0083060 | A1 | 6/2002 | Wang et al. |
| 2003/0046437 | A1 | 3/2003 | Eytchison et al. |
| 2003/0063217 | A1 | 4/2003 | Smith |
| 2004/0143349 | A1 | 7/2004 | Roberts et al. |
| 2005/0144455 | A1 | 6/2005 | Haitsma |
| 2006/0062426 | A1 | 3/2006 | Levy et al. |
| 2006/0182412 | A1 | 8/2006 | Lefevre |
| 2007/0055500 | A1 | 3/2007 | Bilobrov |
| 2007/0124756 | A1 | 5/2007 | Covell et al. |
| 2007/0143777 | A1 | 6/2007 | Wang |
| 2007/0192782 | A1 | 8/2007 | Ramaswamy |
| 2007/0217648 | A1 | 9/2007 | Muehlbauer |
| 2008/0060036 | A1 | 3/2008 | Cox |
| 2008/0082510 | A1 | 4/2008 | Wang et al. |
| 2010/0131970 | A1 | 5/2010 | Falcon |
| 2010/0293568 | A1 | 11/2010 | Jarman |
| 2010/0318587 | A1 | 12/2010 | Seet et al. |
| 2010/0329547 | A1 | 12/2010 | Cavet |
| 2011/0075851 | A1 | 3/2011 | LeBoeuf et al. |
| 2011/0273455 | A1 | 11/2011 | Powar et al. |
| 2011/0289098 | A1 | 11/2011 | Oztaskent et al. |
| 2011/0313856 | A1 | 12/2011 | Cohen et al. |
| 2012/0089911 | A1 | 4/2012 | Hosking et al. |
| 2012/0117584 | A1 | 5/2012 | Gordon |
| 2013/0011008 | A1 | 1/2013 | Ikezoye et al. |
| 2013/0052939 | A1 | 2/2013 | Anniballi et al. |
| 2013/0054645 | A1 | 2/2013 | Bhagavathy et al. |
| 2013/0145414 | A1 | 6/2013 | Yamagishi |
| 2013/0205330 | A1 | 8/2013 | Sinha et al. |
| 2013/0212609 | A1 | 8/2013 | Sinha et al. |
| 2013/0254793 | A1 | 9/2013 | Anniballi et al. |
| 2013/0308818 | A1 | 11/2013 | MacIntosh et al. |
| 2013/0326573 | A1 | 12/2013 | Sharon et al. |
| 2014/0007152 | A1 | 1/2014 | Pora et al. |
| 2014/0013352 | A1 | 1/2014 | Shavit et al. |
| 2014/0059587 | A1 | 2/2014 | Davis et al. |
| 2014/0082655 | A1 | 3/2014 | Moon et al. |
| 2014/0089307 | A1 | 3/2014 | Garside et al. |
| 2014/0115627 | A1 | 4/2014 | Lee et al. |
| 2014/0193027 | A1 | 7/2014 | Scherf et al. |
| 2014/0196077 | A1 | 7/2014 | Gordon et al. |
| 2014/0236988 | A1 | 8/2014 | Harron et al. |
| 2014/0282662 | A1 | 9/2014 | Major |
| 2014/0282693 | A1 | 9/2014 | Soundararajan et al. |
| 2015/0033500 | A1 | 2/2015 | Block et al. |
| 2015/0089526 | A1 | 3/2015 | Gordon |
| 2015/0106839 | A1 | 4/2015 | Shrum, Jr. et al. |
| 2015/0120839 | A1 | 4/2015 | Kannan et al. |
| 2015/0181263 | A1 | 6/2015 | Gordon et al. |
| 2015/0237409 | A1 | 8/2015 | Harper et al. |
| 2016/0094877 | A1 | 3/2016 | Heffernan et al. |
| 2016/0127398 | A1 | 5/2016 | Cohen |
| 2017/0048566 | A1 | 2/2017 | Srinivasan |
| 2017/0251281 | A1* | 8/2017 | Seo ............... H04N 21/23418 |
| 2017/0308556 | A1 | 10/2017 | Gonzales-Brenes, Jr. et al. |
| 2017/0330474 | A1 | 11/2017 | Rho et al. |

FOREIGN PATENT DOCUMENTS

| | | |
|---|---|---|
| EP | 2 763 427 | 11/2011 |
| EP | 2 704 444 | 3/2014 |
| JP | 2001298433 | 10/2001 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

International Search Report and Written Opinion from International Application No. PCT/US2017/019949, dated May 24, 2017.
Office Action from U.S. Appl. No. 15/443,580, dated Dec. 14, 2017.
Office Action from U.S. Appl. No. 15/443,580, dated May 21, 2018.

* cited by examiner dia presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

MEDIA CHANNEL IDENTIFICATION WITH MULTI-MATCH DETECTION AND DISAMBIGUATION BASED ON TIME OF BROADCAST

REFERENCE TO RELATED APPLICATIONS

This is a continuation of U.S. patent application Ser. No. 15/343,895, filed Nov. 4, 2016, which claims priority to U.S. Provisional Patent Application No. 62/301,616, filed Feb. 29, 2016, each of which is hereby incorporated by reference in its entirety. Further, this disclosure hereby incorporates by reference the entirety of U.S. Patent Application Pub. No. 2015/0181263 (published Jun. 25, 2016), U.S. patent application Ser. No. 15/179,143 (filed Jun. 10, 2016), U.S. patent application Ser. No. 15/222,405 (filed Jun. 28, 2016), and U.S. patent application Ser. No. 15/253,354 (filed Aug. 31, 2016).

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered (e.g., being already rendered, currently being rendered, or being in queue to be rendered) by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes reference fingerprints of media content that is carried or scheduled to be carried on a particular channels and could map each reference fingerprint to the channel on which the associated media content is carried or scheduled to be carried. As the media presentation device receives and renders given media content, the media presentation device may then generate a fingerprint of that media content and, through a network communication interface, report the generated fingerprint to the network server for analysis. And the network server may then compare the reported fingerprint with the reference fingerprint data to find a match with a reference fingerprint and to thereby determine that the channel on which the media content is arriving is the channel that the reference data maps with that reference fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be provided on multiple different channels, and so a fingerprint of media content being rendered by a media presentation device may not correlate with just the channel on which the media content is arriving. As a result, if the media presentation device is presenting such media content and generates and provides a fingerprint of the media content, that fingerprint could be mapped to multiple reference fingerprints corresponding respectively with multiple different channels, and consequently the channel-identification would be inconclusive.

As a specific example of this, consider a scenario where two different video content providers both broadcast the same syndicated television show, each on a separate respective channel, and where an advertiser has a contract with just one of the content providers to present a pop-up advertisement on that provider's broadcast of the show. In this scenario, when a media presentation device is receiving and presenting one of these broadcasts, if the media presentation device generates and provides to the network server a fingerprint of the broadcast, the network server may determine that the fingerprint matches both content providers' broadcasts of the show, and so it would be unclear whether the media presentation device should present the pop-up advertisement or not.

Disclosed herein are methods and systems to help disambiguate channel identification in a scenario where fingerprint data of media content matches multiple reference fingerprints corresponding respectively with multiple different channels. In accordance with the disclosure, a network server or other entity carrying out this analysis will detect a multi-match scenario by determining that the fingerprint of the media content at issue matches two or more reference fingerprints corresponding respectively with different channels. Faced with the detected multi-match scenario, the entity will then use context information regarding the media content being rendered by the media presentation device as a basis to disambiguate the channel identity so as to determine which of the channels the media content being rendered by the media presentation device is arriving on, so as to facilitate taking channel-specific action.

One example of such context information is the time of broadcast of the media content being rendered by the media presentation device. In particular, it may be the case that the same media content is scheduled for broadcast on multiple different channels at a different respective time (e.g., date and time of day) per channel. Thus, faced with a multi-match scenario as described above, an entity may perform disambiguation at least in part by determining which of the two or more matching reference fingerprints corresponds with a time of broadcast that matches the actual time of broadcast of the media content being rendered by the media presentation device.

In a representative implementation, for instance, the entity may thereby determine that just a single one of the matching reference fingerprints corresponds with a time of broadcast that matches the actual time of broadcast of the media content being rendered by the media presentation device. Thus, the entity may conclude that the channel corresponding with that single reference fingerprint is the channel on which the content being rendered by the media presentation device is arriving. Alternatively or additionally, the entity may at least eliminate one or more of the matching reference fingerprints from consideration based on a determination that each such reference fingerprint corresponds with a time of broadcast that does not match the actual time of broadcast of the media content being rendered by the media presentation device. Further, the entity may apply one or more additional factors as well if necessary to further disambiguate.

Accordingly, in one respect, disclosed is a method that involves taking action based on a channel determined through time-based disambiguation. The method includes a computing system determining that a fingerprint of media content being rendered by a media presentation device matches multiple reference fingerprints each corresponding with a different respective channel. Further, the method includes, responsive to determining that the fingerprint matches the multiple reference fingerprints each corresponding with a different respective channel, performing disambiguation based at least in part on a time of broadcast of the media content being rendered by the media presentation device, to determine which channel the media presentation device is receiving the media content on (e.g., which channel the media presentation device has received the media content on). And the method then includes taking action based on the determined channel.

Further, in another respect, the disclosed method includes a computing system determining that a fingerprint of media content being rendered by a media presentation device matches multiple reference fingerprints each corresponding with a different respective channel, where each matching reference fingerprint of the multiple reference fingerprints has a corresponding time of broadcast. And the method includes the computing system determining which channel the media presentation device is receiving the media content on, based at least in part on determining that a time of broadcast of the media content being rendered by the media presentation device matches the corresponding time of broadcast of just one of the matching reference fingerprints, where the determined channel is the channel corresponding with the one matching reference fingerprint. The method then involves taking action based on the determining of the channel.

In addition, in another respect, disclosed is a system including a network communication interface, a processing unit, non-transitory data storage, and program instructions stored in (e.g., on) the non-transitory data storage and executable by the processing unit to carry out various operations. The operations include receiving from a media presentation device, via the network communication interface, a fingerprint of media content being rendered by the media presentation device and an indication of time of broadcast of the media content being rendered by the media presentation device. Further, the operations include determining that the received fingerprint matches multiple reference fingerprints each corresponding with a different respective channel. And the operations include, responsive to determining that the received fingerprint matches the multiple reference fingerprints each corresponding with a different respective channel, performing disambiguation based at least in part on a time of broadcast of the media content being rendered by the media presentation device, to determine which channel the media presentation device is receiving the media content on. The operations then include taking action based on the determined channel.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
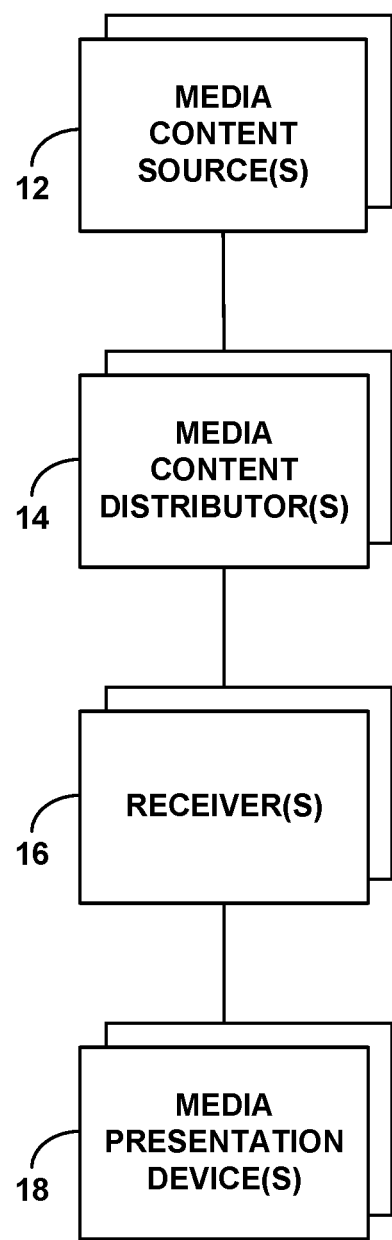
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
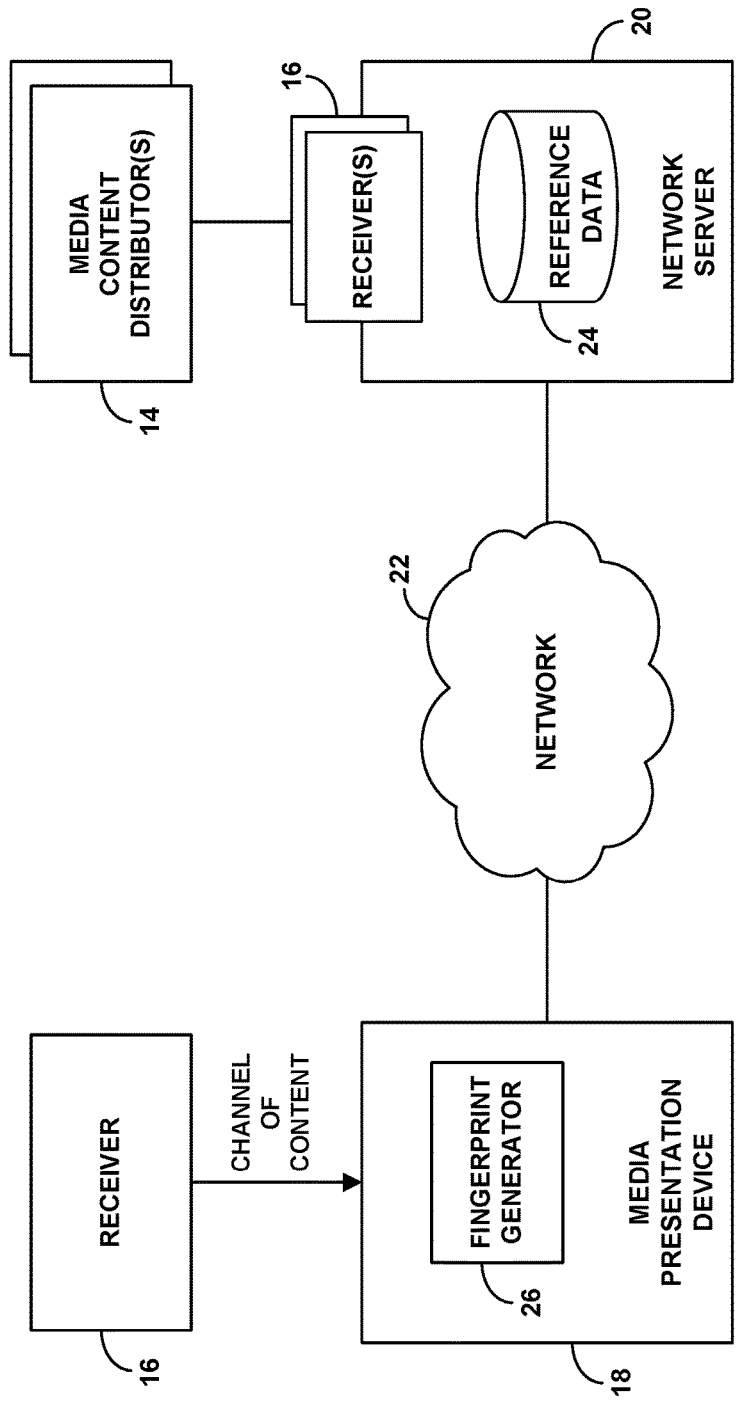
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18. The reference data, which could be stored in a relational database or other form, could include a respective reference fingerprint for each channel, perhaps a reference fingerprint stream of media content that was most recently carried by the channel (e.g., on a sliding window basis covering a most recent period of time). In addition or alternatively, the reference data could include a respective reference fingerprint (e.g., reference fingerprint stream) of each media content program (e.g., television broadcast, radio broadcast, streaming media file, etc.) that is available and/or scheduled to be carried on a particular channel. As such, the reference data could map each reference fingerprint to a channel on which the associated media content (i.e., the content uniquely identified by the reference fingerprint) is or may be carried, and further to a corresponding time of broadcast of the associated media content on that channel.

In mapping reference fingerprints to channels, the reference data could characterize the channels by various attributes, to help distinguish the channels from each other. For example, where a receiver or other such device provides multiple different channels selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distribute content sources' content, the reference data could characterize the channels by their respective content distributors' identities. In practice, the reference data could correlate each reference fingerprint with one or more of these or other attributes.

In mapping the reference fingerprints to corresponding times of broadcast on the channels, the reference data could then specify a time (e.g., date and time of day) at which the associated media content is being broadcast on the associated channel or is scheduled to be broadcast on the associated channel. Such a specification could take various forms. By way of example, if a reference fingerprint defines a sequence of fingerprint time segments representing respective time segments of the associated media content, the reference data could provide a timestamp per fingerprint time segment, indicating an actual or scheduled time of broadcast of the associated time segment of the media content. And as another example, if a reference fingerprint represents a media content program, the reference data could provide a timestamp indicating the actual or scheduled time of broadcast (e.g., programming time range, such as half-hour block) of that media content program as a whole. Other examples are possible as well.

The network server 20 or other entity operating in accordance with the present disclosure could establish some or all of this reference data by analyzing media content arriving on each of the various channels (e.g., at least the media content arriving on each of various channels that are available to a receiver that serves the media presentation device) and/or by receiving program scheduling data from one or more other entities.

To facilitate establishing reference data by analyzing media content arriving on various channels, as shown in FIG. 2, the server could include or be interconnected with one or more receivers 16 that are configured to receive media content from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media content arriving on each channel and to generate for each channel a reference fingerprint of the channel's media content, using any media fingerprinting process now known or later developed (e.g., computing a hash on a per frame or other basis, or otherwise identifying, extracting and digitally representing component features unique to the media content). Further, as the server generates the reference fingerprint for a channel, the server could also record in association with the fingerprint one or more timestamps indicating the time of receipt of the associated media content on the channel, defining the time of broadcast of the media content on the channel.

In practice, the server could be configured to receive concurrently on multiple such channels (perhaps all of the channels) and to analyze and generate respective fingerprints and timestamps for the channels in parallel, or the server might be configured to hop from channel to channel, possibly repeatedly cycling through the channels, to analyze and generate a respective fingerprint and timestamp for each channel. Further, the server could continue to do this in real-time, saving a respective fingerprint of at least a most recent time window of media content for each channel, for reference. And the server could record each channel's reference fingerprint in the reference data in association with timestamp information and channel characterization information as discussed above. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint.

Further, the server could receive or perhaps establish such reference fingerprints for media content programs that are available or scheduled to be broadcast on particular channels at particular times. For instance, providers or distributors of various media content programs could generate reference fingerprints for the media content programs, again using any media fingerprinting process now known or later developed, and the server could receive those reference fingerprints along with indications of the channels on which the associated media content programs are scheduled to be broadcast and of the scheduled times of broadcast on those channels. The server could thus record each such reference fingerprint in association with scheduled time and channel information of the associated media content program. Alternatively, the server could receive advance copies of the media content programs from the providers or distributors, along with scheduled time and channel information, and the server could itself generate reference fingerprints for each media content program and record each generated reference fingerprint in association with the scheduled time and channel information. Other examples are possible as well.

Given this or other such reference data, when the server is presented with a fingerprint of media content that was received on an unknown channel, the server could match the fingerprint with one of the stored reference fingerprints, using any fingerprint matching process now known or later developed, and could thereby conclude that the media content at issue arrived on the channel that the reference data maps to the matching reference fingerprint. Thus, if the server is faced with a fingerprint of media content that is being rendered by the media presentation device 18, the server could compare the fingerprint with the reference fingerprints in the reference data. And if the server thereby finds a matching reference fingerprint, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a fingerprint of the media content that is being rendered by the media presentation device and to transmit the fingerprint to server 20 for analysis.

For instance, as shown in FIG. 2, the media presentation device could include a fingerprint generator 26, which could be configured to generate a digital fingerprint of media content being rendered by the media presentation device. Such a fingerprint generator could be configured to generate the fingerprint of media content as the media presentation device is receiving the media content on a channel from a receiver 16 and/or as the media presentation device is processing the media content for presentation. As such, the fingerprint generator could receive as input a copy of the media content arriving at the media presentation device from the receiver and/or being processed for presentation by the media presentation device, and to apply any media fingerprinting process now known or later developed to generate a fingerprint of the media content.

In practice, the fingerprint generator could be configured to generate such a fingerprint as a fingerprint stream on an ongoing basis, such as on a per frame basis (e.g., on per key-frame basis) or other basis. And the media presentation device could be configured to transmit the fingerprint via network 22 to server 20 for analysis. By way of example, the media presentation device could be configured to periodically or from time to time transmit to the server a fingerprint representing a latest frame, series of frames or other segment or portion of the media content being rendered by the media presentation device. In particular, the media presentation device could generate a message carrying the latest generated fingerprint and could transmit the message to the server's IP address. Such a message could implicitly or explicitly indicate the current time, thus establishing a time at which the media content at issue is being broadcast and/or being rendered by the media presentation device. And the server may thereby receive the fingerprint and time information for analysis.

Alternatively, the media presentation device could transmit to the server, and the server could thus receive, various data regarding the media content being rendered by the media presentation device, likewise on an ongoing basis or other basis, to enable the server itself or another entity to generate a fingerprint of the media content being rendered by the media presentation device. For example, the media presentation device could transmit to the server portions of the media content being rendered by the media presentation device, such as individual frames (e.g., snapshots) or other segments of the media content, again implicitly or explicitly indicating the associated time information. And the server could apply any media fingerprinting process now known or later developed to generate a fingerprint of the media content for analysis and could associate the fingerprint with the indicated time information.

Through the process described above, the server could then compare the fingerprint of the media content being rendered by the media presentation device with the reference fingerprints in the reference data, using any digital fingerprint comparison process now known or later developed. And as noted above, if the server thereby finds a matching reference fingerprint, the server could determine the channel that the reference data maps with the matching reference fingerprint and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a fingerprint of the media content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a fingerprint of the media content being rendered by the media presentation device and the server determining that the received fingerprint matches a reference fingerprint of media content that the server is concurrently receiving (or has scheduled for the same time) on a known channel.

In some cases, however, there may be a time difference between when the media presentation device renders the media content and timestamps and transmits the fingerprint to the server and when the server receives the media content on the known channel and otherwise has the reference fingerprint timestamped. The server could account for this time difference by comparing the received fingerprint over a sliding window of the reference fingerprint or vice versa. Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, perhaps by detecting among the reference data various reference fingerprints that match each other and that match a fingerprint of media content being rendered by the media presentation device.

In one implementation, for instance, the server could regularly analyze the reference data in search of multi-match scenarios, comparing pairs of reference fingerprints in the reference data using any now known or later developed media fingerprint matching process, in an effort to find reference fingerprints that match each other. Upon finding each such match of at least two of the reference fingerprints, the server could then flag the reference fingerprints as being a multi-match group. Such a flag could indicate that there will be a potential ambiguity if the fingerprint of media content being rendered by the media presentation device matches any of the reference fingerprints in the flagged multi-match group. The server could flag the reference fingerprints as being a multi-match group in various ways. For instance, the server could cross-reference the reference fingerprints of the multi-match group in the reference data, to indicate that they are members of a multi-match group. Alternatively, the server could store a single copy of the reference fingerprint and associate that copy with various channels on which the media content represented by the reference fingerprint is carried, indicating for each channel the associated time of broadcast on that channel, as well as other information.

With this implementation, when the server receives from a media presentation device a fingerprint of media content being rendered by the media presentation device and the server determines that the received fingerprint matches a reference fingerprint, the server could then readily determine from the reference data whether a multi-match situation exists. If the matching reference fingerprint is not flagged as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media content being rendered by the media presentation device. Whereas, if the matching reference fingerprint is flagged as being a member of a multi-match group, then the server could conclude that a multi-match situation (rather than a single-match situation) exists, in which case the server may need to perform a disambiguation process to help identify the channel at issue from among those associated with the reference fingerprints of the multi-match group.

Alternatively, in another implementation, the server could identify a multi-match group at the time the server receives a fingerprint from the media presentation device. For instance, when (e.g., as) the server receives the fingerprint from the media presentation device, the server could compare the received fingerprint with all of the reference fingerprints in the reference data. If the server thereby detects that the received fingerprint matches only one of the reference fingerprints, then the server could conclude that a single-match situation (rather than a multi-match situation) exists, in which case the server could then readily determine from the reference data the channel associated with the matching reference fingerprint and could conclude that that is the channel carrying the media content being rendered by the media presentation device. Whereas, if the server detects that the received fingerprint matches two or more of the reference fingerprints, then the server could conclude that a multi-match situation (rather than a single-match situation) exists, in which case the server may need to perform a disambiguation process to help identify the channel at issue from among those associated with the reference fingerprints of the multi-match group.

As noted above, when the server or other entity carrying out this analysis detects that the fingerprint of the media content being rendered by the media presentation device matches multiple reference fingerprints corresponding with multiple channels, the entity could apply a disambiguation process to help determine which of the channels associated with the multi-match group is the actual channel carrying the media content being rendered by the media presentation device.

Further, in accordance with the present disclosure, a useful example of such context information is time of broadcast of the media content being rendered by the media presentation device. In particular, it may be the case that the same media content is broadcast on multiple channels at a different time on each channel, such as on a different date and/or in a different programming time segment (e.g., a different half hour or hour block of programming time) per channel. In that case, each of two or more reference fingerprints in a multi-match group could have a respective time of broadcast (the associated time at which the media content represented by the reference fingerprint is broadcast or is scheduled to be broadcast on the associated channel), and knowledge of the time of broadcast of the media content being rendered by the media presentation device could then be used as a basis (alone or in combination with one or more other factors) to disambiguate between the two or more matching reference fingerprints.

To facilitate this in practice, when the media presentation device transmits to the server a fingerprint of the media content being rendered by the media presentation device (or transmits to the server the media content or associated data to enable the server to generate such a fingerprint), the media presentation device could implicitly or explicitly also provide the server with an indication of the time of broadcast of the media content being rendered by the media presentation device. Here, the time of broadcast could be defined as the time at which the media presentation device receives and renders the media content for presentation and may thus be a current time in a scenario where the media presentation device interacts with the server in substantially real time to facilitate channel identification. (This should work best in a scenario where the receiver or other source providing the media content to the media presentation device for playout has not time-shifted the media content.) And as noted above, the time at issue could be a date and a time of day, perhaps a range of time.

The media presentation device can implicitly communicate this indication of time to the server by merely transmitting the fingerprint (or associated data) to the server at the time, with the server treating the current time (e.g., time of receipt of the fingerprint from the media presentation device) as representing the time broadcast of the media content being rendered by the media presentation device. Alternatively, the media presentation device can explicitly communicate this indication of time to the server by generating and including a timestamp or the like in its transmission to the server, perhaps as header metadata accompanying the fingerprint data.

Given knowledge of the time of broadcast of the media content being rendered by the media presentation device, the server could use that time of broadcast as a basis to resolve the multi-match scenario. In particular, the server could compare the time of broadcast of the media content being rendered by the media presentation device with the times of broadcast that the reference data indicates respectively for the members of the multi-match group, in an effort to find a multi-match group member that has a matching time of broadcast, or perhaps to at least eliminate from consideration a multi-match group member that does not have a matching time of broadcast.

The server could compare the time of broadcast of the media content being rendered by the media presentation device with the time of broadcast associated with a reference fingerprint in various ways. For example, the server could determine whether the times of broadcast are threshold or substantially close to each other, such as within 5, 10 or 15 minutes of each other or within another defined tolerance that could reasonably support a conclusion that the broadcasts match, even though they may be somewhat time shifted in relation to each other. And as another example, where one of the times of broadcast is a range of time, the server could determine whether the other time of broadcast falls within that range as an indication that the times of broadcast match. Other examples are possible as well.

Through this analysis, the server may determine that the time of broadcast of the media content being rendered by the media presentation device matches the time of broadcast associated with just one of the reference fingerprints of the multi-match group, thereby establishing that the channel associated with that one reference fingerprint is the channel on which the media content being rendered by the media presentation device is arriving. Alternatively, the server may at least determine that the time of broadcast of the media content being rendered by the media presentation device does not match the time of broadcast associated with one or more of the reference fingerprints of the multi-match group, thereby at least eliminating each such reference fingerprint from consideration.

By way of example, consider a scenario where the media content that is being rendered by the media presentation device had been scheduled for broadcast on three channels, A, B, and C, at separate times $T_A$, $T_B$, and $T_C$, respectively, and where the reference data thus includes three matching reference fingerprints $FP_A$, $FP_B$, and $FP_C$, based on those broadcasts having been scheduled on those channels at those times. In particular, the reference data may associate reference fingerprint $FP_A$ with channel A for the broadcast scheduled at time $T_A$, the reference data may associate reference fingerprint $FP_B$ with channel B for the broadcast scheduled at time $T_B$, and the reference data may associate reference fingerprint $FP_S$ with channel C for the broadcast scheduled at time $T_C$.

In this example, the server may receive from the media presentation device a fingerprint of the media content at time $T_A$ (e.g., the current time), and the server could detect a multi-match situation by determining that the fingerprint of the media content being rendered by the media presentation device matches reference fingerprints $FP_A$, $FP_B$, and $FP_C$ corresponding respectively with different channels. Further, the server could resolve that multi-match situation by determining that the time of broadcast of the media content being rendered by the media presentation device, namely, time $T_A$, matches the time of broadcast associated with just reference fingerprint $FP_A$. Given this, the server could reasonably conclude that the channel associated with reference fingerprint $FP_A$, namely, channel A, is the channel on which the media content being rendered by the media presentation device is arriving, to facilitate taking channel-specific action accordingly.

As another example, consider a scenario where the media content that is being rendered by the media presentation device at time $T_A$ is currently being broadcast on channels A and B and had also been scheduled for broadcast on channel C at a different time $T_B$. In this scenario, the reference data may again include three matching reference fingerprints $FP_A$, $FP_B$, and $FP_C$, with (i) reference fingerprints $FP_A$ and $FP_B$ being based on the server's evaluation of the media content currently arriving on known channels A and B, and each having associated broadcast time $T_A$, and (ii) reference fingerprint $FP_C$ being based on the scheduling of the broadcast on channel C at time $T_B$.

In this example, the server may receive from the media presentation device a fingerprint of the media content at time $T_A$ (e.g., the current time), and the server could similarly detect a multi-match situation by determining that the fingerprint of the media content being rendered by the media presentation device matches reference fingerprints $FP_A$, $FP_B$, and $FP_C$ corresponding respectively with different channels. Further, the server could determine that the time of broadcast of the media content being rendered by the media presentation device does not match the time of broadcast of reference fingerprint $FP_C$, and so the server could reasonably conclude that the channel associated with reference fingerprint $FP_C$ is not the channel on which the media content being rendered by the media presentation device is arriving. Through this process, the server could thus advantageously focus its analysis on reference fingerprints $FP_A$ and $FP_C$, having eliminated consideration of reference fingerprint $FP_C$. And the server could work to disambiguate as between reference fingerprints $FP_A$ and $FP_C$, based on one or more additional factors, such as location of the media presentation device and/or fingerprint analysis of channel-specific content or the like. Other examples are possible as well.

Note that while the discussion herein focuses primarily on server 20 identifying a multi-match situation and then disambiguating based on consideration of context, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, and the media presentation device could itself refer to the reference data to identify a multi-match situation, to disambiguate, and to identify the channel that provides the media content being rendered by the media presentation device. Further, for efficiency, the media presentation device could be provided with a set of reference data specifically for the group of channels that match a query fingerprint (e.g., in response to the server detecting a multi-match situation involving those channels), and the media presentation device could then perform disambiguation itself by making comparisons between such reference data and subsequently derived query fingerprints. Still further, the media presentation device could then itself take channel-specific action, such as presenting channel-specific content, recording channel presentation, or the like, or could cause one or more other entities to take such action.

Figure 3:
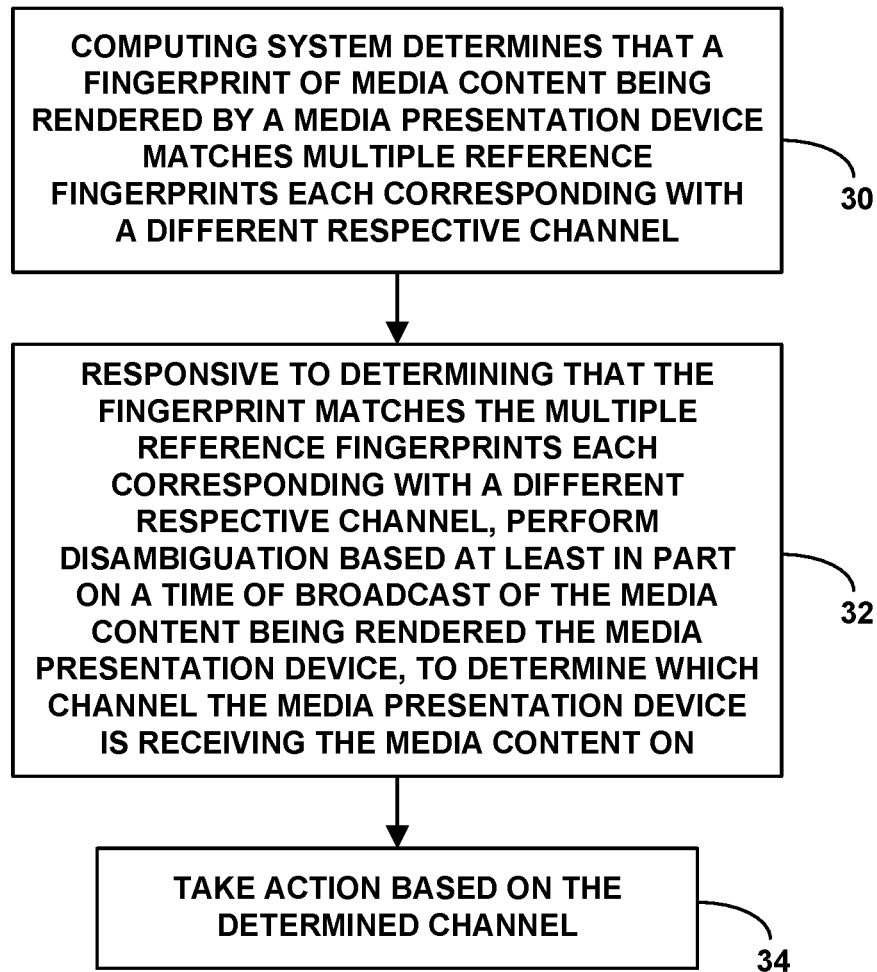
FIG. 3 is a flow chart depicting operations that can be carried out in accordance with the present disclosure.

FIG. 3 is next a flow chart depicting a method that can be carried out in line with the discussion above. One or more of the operations in the method depicted by FIG. 3 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 3, at block 30, the method includes a computing system determining that a fingerprint of media content (e.g., video content and/or audio content) being rendered by a media presentation device matches multiple reference fingerprints each corresponding with a different respective channel. At block 32, the method then includes, responsive to determining that the fingerprint matches the multiple reference fingerprints each corresponding with a different respective channel, performing disambiguation based at least in part on a time of broadcast of the media content being rendered the media presentation device, to determine which channel the media presentation device is receiving the media content on. And at block 34, the method includes taking action based on the determined channel.

In line with the discussion above, the computing system could be an entity other than the media presentation device, and the fingerprint of the media content being rendered by the media presentation device could be generated by the media presentation device. The method could then involve the computing system receiving from the media presentation device the fingerprint of media content being rendered by the media presentation device.

Further, as discussed above, the multiple reference fingerprints could be selected from a plurality of reference fingerprints in reference data, in which case determining that the fingerprint of media content being rendered by the media presentation device matches the multiple reference fingerprints could involve (i) comparing the fingerprint of media content being rendered by the media presentation device with the plurality of reference fingerprints in the reference data and (ii) based on the comparing, determining that the fingerprint of media content being rendered by the media presentation device matches the multiple reference fingerprints.

Still further, as discussed above, the method could involve detecting and flagging a multi-match group including the multiple reference fingerprints, in which case determining that the fingerprint of media content being rendered by the media presentation device matches the multiple reference fingerprints could involve determining that the fingerprint matches the reference fingerprints of the flagged multi-match group.

Additionally in line with the discussion above, the act of performing disambiguation based at least in part on the time of broadcast of the media content being rendered by the media presentation device could involve (i) determining the time of broadcast of the media content being rendered by the media presentation device and (ii) using the determined time of broadcast of the media content being rendered by the media presentation device as a basis to determine which one of the matching reference fingerprints corresponds with the channel on which the media presentation device is receiving the media content.

Further, as discussed above, the act of determining the time of broadcast of the media content being rendered by the media presentation device could involve receiving implicitly or explicitly from the media presentation device an indication of the time of broadcast of the media content being rendered by the media presentation device and/or deeming the current time (e.g., a time of receipt of the fingerprint from media presentation device) to be the time of broadcast of the media content being rendered by the media presentation device.

In addition as discussed above, each of the matching reference fingerprints could have a corresponding time of broadcast. And the act of using the determined time of broadcast of the media content being rendered by the media presentation device as a basis to determine which one of the matching reference fingerprints corresponds with the channel on which the media presentation device is receiving the media content could involve (i) comparing the determined time of broadcast of the media content being rendered by the media presentation device with each matching reference fingerprint's corresponding time of broadcast and (ii) determining based on the comparing that the time of broadcast of the media content being rendered by the media presentation device matches just the time of broadcast corresponding with the one matching reference fingerprint and/or determining based on the comparing that the time of broadcast of the media content being rendered by the media presentation device does not match another one of the matching reference fingerprints (so as to help focus the analysis).

Further, in line with the discussion above, the act of taking action based on the determined channel comprises an action selected from the group consisting of (i) causing supplemental channel-specific content to be presented in conjunction with the media content being rendered by the media presentation device and (ii) recording presentation of the determined channel for use in a channel ratings system.

Figure 4:
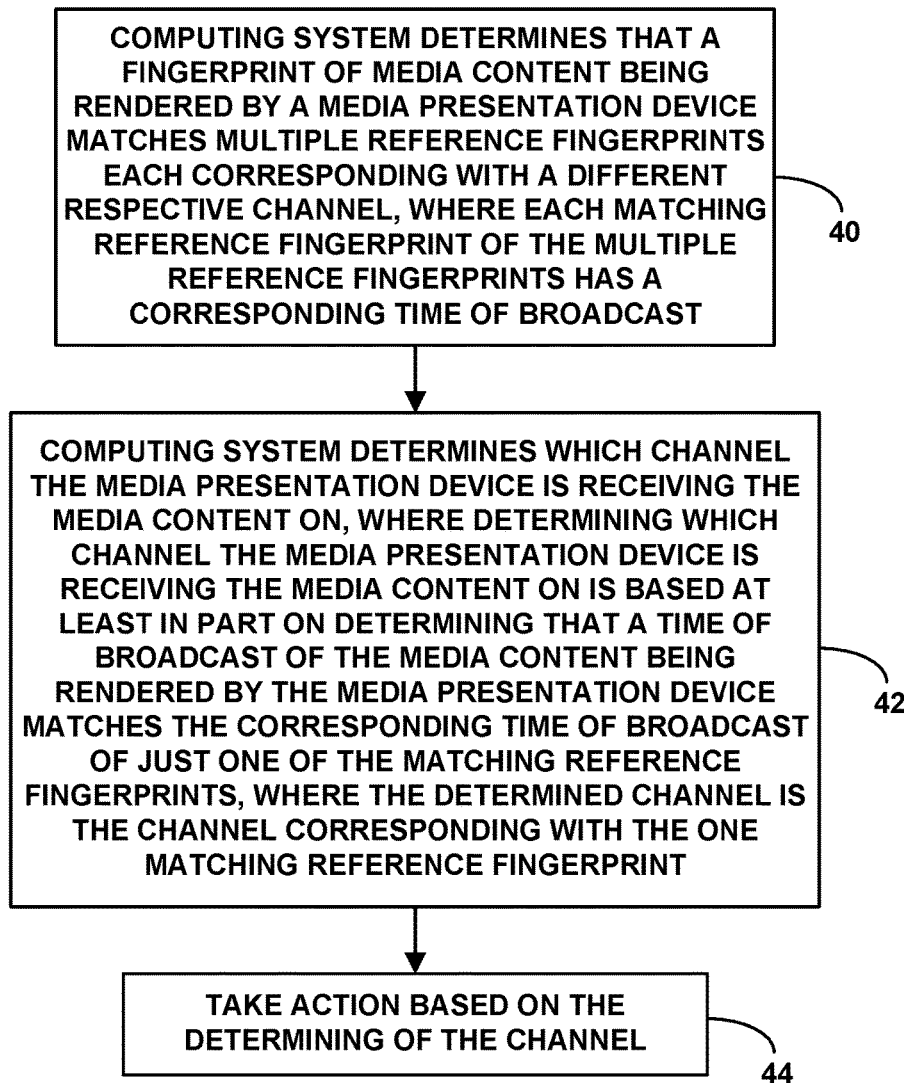
FIG. 4 is another flow chart depicting operations that can be carried out in accordance with the present disclosure.

FIG. 4 is next another flow chart depicting operations that can be carried out in line with the discussion above, similarly by one or more entities such as those noted above, and in combination with various features described above.

As shown in FIG. 4, at block 40, the method includes a computing system determining that a fingerprint of media content (e.g., video and/or audio content) being rendered by a media presentation device matches multiple reference fingerprints each corresponding with a different respective channel, where each matching reference fingerprint of the multiple reference fingerprints has a corresponding time of broadcast. Further, at block 42 (perhaps in conjunction with block 40), the method includes the computing system determining which channel the media presentation device is receiving the media content on, where determining which channel the media presentation device is receiving the media content on is based at least in part on determining that a time of broadcast of the media content being rendered by the media presentation device matches the corresponding time of broadcast of just one of the matching reference fingerprints, where the determined channel is the channel corresponding with the one matching reference fingerprint. And at block 44, the method includes taking action (e.g., as described above) based on the determining of the channel.

Figure 5:
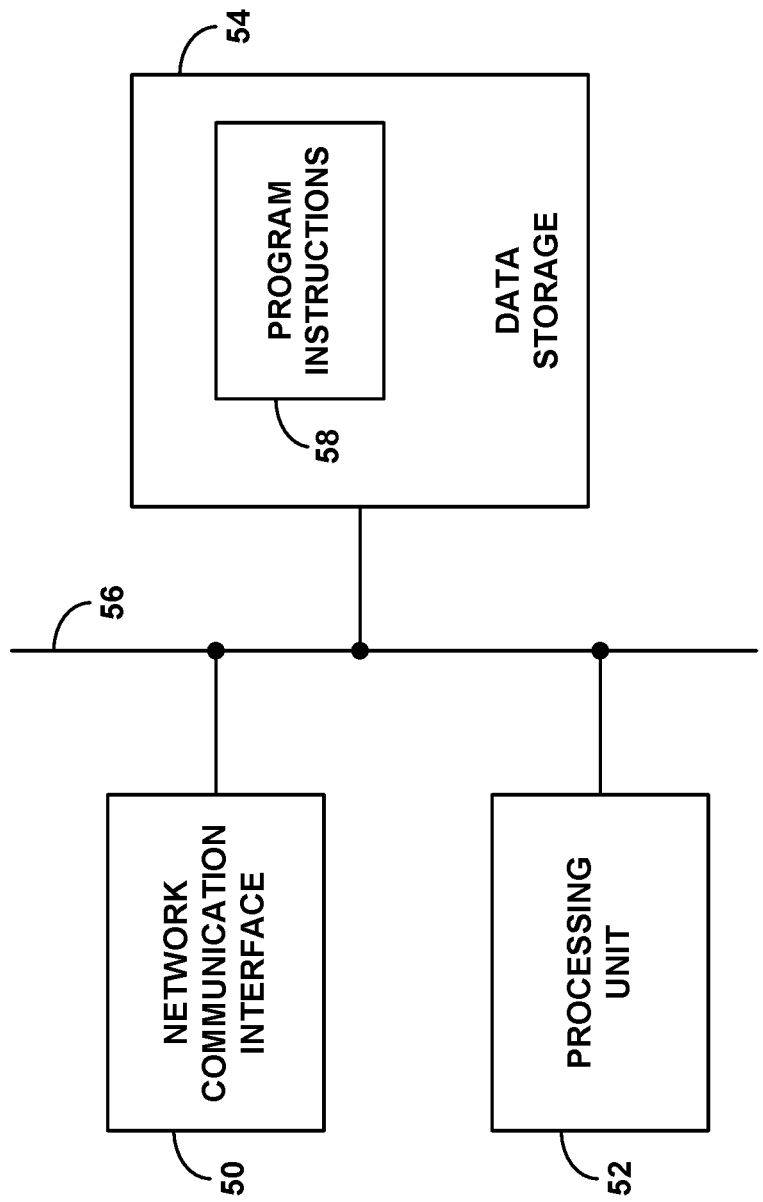
FIG. 5 is a simplified block diagram of an example network server.

FIG. 5 is next a simplified block diagram of an example system operable in accordance with the present disclosure. This system could represent a network server as described above, and/or one or more other entities (possibly including the media presentation device). As shown in FIG. 5, the example system includes a network communication interface 50, a processing unit 52, non-transitory data storage 54, any or all of which could be integrated together or, as shown, communicatively linked together by a system bus, network, or other connection mechanism 56.

Network communication interface 50 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 52 could then comprise one or more general purpose processors (e.g., microprocessors) and/or one or more specialized processors (e.g., application specific integrated circuits). And non-transitory data storage 54 could comprise one or more volatile and/or non-volatile storage components, such as optical, magnetic, or flash storage.

As shown, data storage 54 then stores program instructions 58, which could be executable by processing unit 52 to carry out various operations described herein. For example, the program instructions could be executable to (i) receive from a media presentation device, via the network communication interface, a fingerprint of media content being rendered by the media presentation device and an indication of time of broadcast of the media content being rendered by the media presentation device, (ii) determine that the received fingerprint matches multiple reference fingerprints each corresponding with a different respective channel, (iii) responsive to determining that the received fingerprint matches the multiple reference fingerprints each corresponding with a different respective channel, perform disambiguation based at least in part on the time of broadcast of the media content being rendered by the media presentation device, to determine which channel the media presentation device is receiving the media content on, and (iv) take action based on the determined channel. Various features described above could be applied in this context as well.

Figure 6:
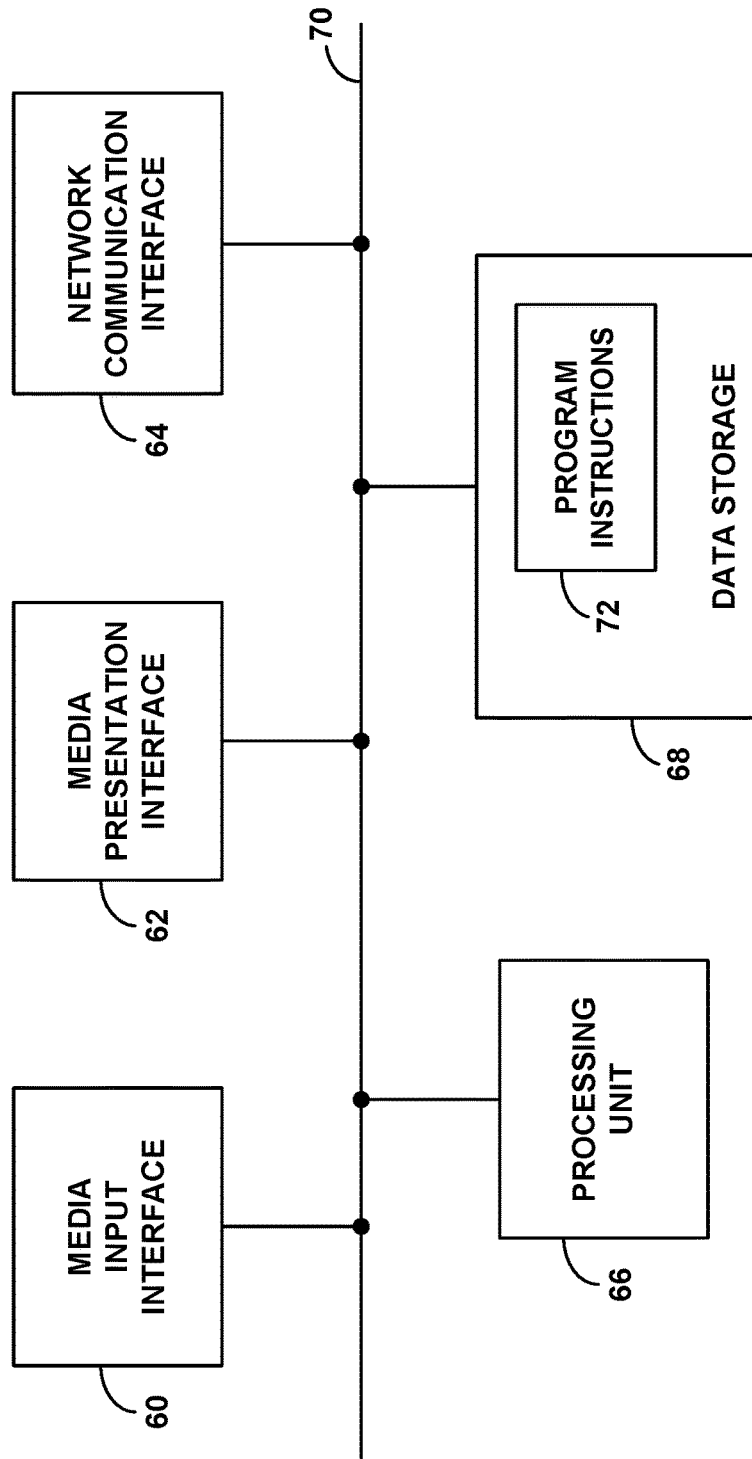
FIG. 6 is a simplified block diagram of an example media presentation device.

Finally, FIG. 6 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example media presentation device includes a media input interface 60, a media presentation interface 62, a network communication interface 64, a processing unit 66, and non-transitory data storage 68, any or all of which could be integrated together or, as shown, communicatively linked together by a system bus, network, or other connection mechanism 70.

Media input interface 60 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 62 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 64 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 66 could then comprise one or more general purpose processors (e.g., microprocessors) and/or one or more specialized processors (e.g., application specific integrated circuits). And non-transitory data storage 68 could comprise one or more volatile and/or non-volatile storage components, such as optical, magnetic, or flash storage. Further, as shown, data storage 68 stores program instructions 72, which could be executable by processing unit 66 to carry out various operations described here. For example, the program instructions could be executable to generate on an ongoing basis a fingerprint of media content being rendered by the media presentation device, based on analysis of the media content being received at the media input interface 60 and/or being processed at the media presentation interface, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A non-transitory computer readable medium having stored thereon instructions executable by a processing unit to carry out operations comprising:
   determining that a fingerprint of media content being rendered by a media presentation device matches multiple reference fingerprints each corresponding with a different respective channel;
   responsive to determining that the fingerprint matches the multiple reference fingerprints each corresponding with a different respective channel, performing disambiguation based at least in part on a time of broadcast of the media content being rendered by the media presentation device, to determine which channel the media presentation device is receiving the media content on; and
   taking action based on the determined channel.

2. The non-transitory computer readable medium of claim 1, wherein the operations further comprise:
   receiving, from the media presentation device, the fingerprint of media content being rendered by the media presentation device.

3. The non-transitory computer readable medium of claim 1, wherein the multiple reference fingerprints are selected from a plurality of reference fingerprints in reference data, and wherein determining that the fingerprint of media content being rendered by the media presentation device matches the multiple reference fingerprints comprises:
   comparing the fingerprint of media content being rendered by the media presentation device with the plurality of reference fingerprints in the reference data; and
   based on the comparing, determining that the fingerprint of media content being rendered by the media presentation device matches the multiple reference fingerprints.

4. The non-transitory computer readable medium of claim 3, wherein the operations further comprise detecting and flagging a multi-match group comprising the multiple reference fingerprints, wherein determining that the fingerprint of media content being rendered by the media presentation device matches the multiple reference fingerprints comprises determining that the fingerprint matches the reference fingerprints of the flagged multi-match group.

5. The non-transitory computer readable medium of claim 1, wherein performing disambiguation based at least in part on the time of broadcast of the media content being rendered by the media presentation device comprises:
determining the time of broadcast of the media content being rendered by the media presentation device; and
using the determined time of broadcast of the media content being rendered by the media presentation device as a basis to determine which one of the matching reference fingerprints corresponds with the channel on which the media presentation device is receiving the media content.

6. The non-transitory computer readable medium of claim 5, wherein determining the time of broadcast of the media content being rendered by the media presentation device comprises receiving implicitly or explicitly from the media presentation device an indication of the time of broadcast of the media content being rendered by the media presentation device.

7. The non-transitory computer readable medium of claim 5, wherein determining the time of broadcast of the media content being rendered by the media presentation device comprises deeming a current time to be the time of broadcast of the media content being rendered by the media presentation device.

8. The non-transitory computer readable medium of claim 5, wherein each of the matching reference fingerprints has a corresponding time of broadcast, and wherein using the determined time of broadcast of the media content being rendered by the media presentation device as a basis to determine which one of the matching reference fingerprints corresponds with the channel on which the media presentation device is receiving the media content comprises:
comparing the determined time of broadcast of the media content being rendered by the media presentation device with each matching reference fingerprint's corresponding time of broadcast, and
determining based on the comparing that the time of broadcast of the media content being rendered by the media presentation device matches just the time of broadcast corresponding with the one matching reference fingerprint.

9. The non-transitory computer readable medium of claim 5, wherein each of the matching reference fingerprints has a corresponding time of broadcast, and wherein using the determined time of broadcast of the media content being rendered by the media presentation device as a basis to determine which one of the matching reference fingerprints corresponds with the channel on which the media presentation device is receiving the media content comprises:
comparing the determined time of broadcast of the media content being rendered by the media presentation device with each matching reference fingerprint's corresponding time of broadcast, and
determining based on the comparing that the time of broadcast of the media content being rendered by the media presentation device does not match another one of the matching reference fingerprints.

10. The non-transitory computer readable medium of claim 1, wherein taking action based on the determined channel comprises causing supplemental channel-specific content to be presented in conjunction with the media content being rendered by the media presentation device.

11. The non-transitory computer readable medium of claim 1, wherein the media content comprises content selected from the group consisting of video content and audio content.

12. The non-transitory computer readable medium of claim 1, wherein taking action based on the determined channel comprises recording presentation of the determined channel for use in a channel ratings system.

13. A non-transitory computer readable medium having stored thereon instructions executable by a processing unit to carry out operations comprising:
determining that a fingerprint of media content being rendered by a media presentation device matches multiple reference fingerprints each corresponding with a different respective channel, wherein each matching reference fingerprint of the multiple reference fingerprints has a corresponding time of broadcast;
determining which channel the media presentation device is receiving the media content on, wherein determining which channel the media presentation device is receiving the media content on is based at least in part on determining that a time of broadcast of the media content being rendered by the media presentation device matches the corresponding time of broadcast of just one of the matching reference fingerprints, wherein the determined channel is the channel corresponding with the one matching reference fingerprint; and
taking action based on the determining of the channel.

14. The non-transitory computer readable medium of claim 13, wherein taking action based on the determining of the channel comprises causing supplemental channel-specific content to be presented in conjunction with the media content being rendered by the media presentation device.

15. The non-transitory computer readable medium of claim 13, wherein the media content comprises content selected from the group consisting of video content and audio content.

16. The non-transitory computer readable medium of claim 13, wherein taking action based on the determining of the channel comprises recording presentation of the determined channel for use in a channel ratings system.

17. A system comprising:
a network communication interface;
a processing unit;
non-transitory data storage; and
program instructions stored in the non-transitory data storage and executable by the processing unit to carry out operations including:
receiving from a media presentation device, via the network communication interface, a fingerprint of media content being rendered by the media presentation device and an indication of time of broadcast of the media content being rendered by the media presentation device,
determining that the received fingerprint matches multiple reference fingerprints each corresponding with a different respective channel,
responsive to determining that the received fingerprint matches the multiple reference fingerprints each corresponding with a different respective channel, performing disambiguation based at least in part on the time of broadcast of the media content being rendered by the media presentation device, to determine which channel the media presentation device is receiving the media content on, and
taking action based on the determined channel.

18. The system of claim 17, wherein each of the matching reference fingerprints has a corresponding time of broadcast, and wherein performing disambiguation based at least in part on the time of broadcast of the media content being rendered by the media presentation device, to determine which channel the media presentation device is receiving the media content on, comprises:
- comparing the determined time of broadcast of the media content being rendered by the media presentation device with each matching reference fingerprint's corresponding time of broadcast, and
- determining based on the comparing that the time of broadcast of the media content being rendered by the media presentation device matches just the time of broadcast corresponding with one of the matching reference fingerprints, and deeming the channel corresponding with the one matching reference fingerprint to be the determined channel.

19. The system of claim 17, wherein taking action based on the determined channel comprises causing supplemental channel-specific content to be presented in conjunction with the media content being rendered by the media presentation device.

20. The system of claim 17, wherein taking action based on the determined channel comprises recording presentation of the determined channel for use in a channel ratings system.

* * * * *